US012254722B2

(12) United States Patent
Cenanovic et al.

(10) Patent No.: US 12,254,722 B2
(45) Date of Patent: Mar. 18, 2025

(54) OPERATING A COMMUNICATION DEVICE OF A MOTOR VEHICLE

(71) Applicant: AUDI AG, Ingolstadt (DE)

(72) Inventors: Amir Cenanovic, Hepberg (DE); Lars Reichardt, Wettstetten (DE)

(73) Assignee: Audi AG, Ingolstadt (DE)

( * ) Notice: Subject to any disclaimer, the term of this patent is extended or adjusted under 35 U.S.C. 154(b) by 281 days.

(21) Appl. No.: 18/004,011

(22) PCT Filed: May 18, 2021

(86) PCT No.: PCT/EP2021/063062
§ 371 (c)(1),
(2) Date: Dec. 30, 2022

(87) PCT Pub. No.: WO2022/002476
PCT Pub. Date: Jan. 6, 2022

(65) Prior Publication Data
US 2023/0260333 A1 Aug. 17, 2023

(30) Foreign Application Priority Data
Jul. 1, 2020 (DE) .................... 10 2020 117 335.0

(51) Int. Cl.
*H04B 17/20* (2015.01)
*G07C 5/00* (2006.01)

(52) U.S. Cl.
CPC ........... *G07C 5/008* (2013.01); *H04B 17/202* (2023.05)

(58) Field of Classification Search
CPC ........ G07C 5/008; H04B 17/202; H04B 7/10; H04W 52/146; H04W 52/245; H04W 52/383; H04W 52/42
See application file for complete search history.

(56) References Cited

U.S. PATENT DOCUMENTS 9,692,549 B2   6/2017  Lee et al.
2008/0317098 A1* 12/2008 Juntunen .................. H04B 7/10
                                                       375/E1.001

(Continued)

FOREIGN PATENT DOCUMENTS

| DE | 102007029952 A1 | 1/2009 |
| JP | 4944719 B2 | 6/2012 |
| JP | 2019029905 A | 2/2019 |

OTHER PUBLICATIONS

International Preliminary Report on Patentability directed to related International Patent Application No. PCT/EP2021/063062, issued Dec. 13, 2022, with attached English-language translation; 15 pages.

(Continued)

*Primary Examiner* — Wilson Lee
(74) *Attorney, Agent, or Firm* — Sterne, Kessler, Goldstein & Fox P.L.L.C.

(57) ABSTRACT

The present disclosure relates to a method for operating a communication device of a motor vehicle. The communication device communicates with at least one other motor vehicle or at least one stationary receiver, wherein for this purpose, a wireless communication connection based on linearly polarized electromagnetic waves is used. In order to use the communication connection, a transmission signal is transmitted with a specified transmission power by the communication device, and the transmission power is reduced on the basis of the reception of a reception signal by means of the communication device, said reception signal using electromagnetic waves which are at least partly orthogonally polarized relative to the linearly polarized electromagnetic waves.

6 Claims, 5 Drawing Sheets

(56) References Cited

U.S. PATENT DOCUMENTS

| | | | |
|---|---|---|---|
| 2010/0304680 A1 | 12/2010 | Kuffner et al. | |
| 2012/0089299 A1* | 4/2012 | Breed | B60R 21/013 |
| | | | 701/1 |
| 2013/0235962 A1* | 9/2013 | O'Keefe | H04B 17/12 |
| | | | 375/371 |
| 2019/0335401 A1* | 10/2019 | Lindenmeier | H04W 52/10 |
| 2020/0067204 A1* | 2/2020 | Takei | H04B 7/10 |
| 2022/0321391 A1* | 10/2022 | Jamal | H04L 27/34 |
| 2023/0089409 A1* | 3/2023 | Woo | H01Q 9/0407 |
| | | | 455/73 |

OTHER PUBLICATIONS

International Search Report of the International Searching Authority and Written Opinion for International Patent Application PCT/EP2021/063062, mailed Aug. 9, 2021, with attached English-language translation; 13 pages.

\* cited by examiner

OPERATING A COMMUNICATION DEVICE OF A MOTOR VEHICLE

TECHNICAL BACKGROUND

The present disclosure relates to a method for operating a communication device of a motor vehicle, in which the communication device communicates at least with at least one other motor vehicle or at least with one stationary receiver, for which purpose a wireless communication connection based on linearly polarized electromagnetic waves is used, wherein a transmission signal is transmitted by the communication device with a preset transmission power for using the communication connection. Further, the present disclosure relates to a communication device for arrangement in a motor vehicle, wherein the communication device is formed to communicate at least with at least one other motor vehicle or at least one stationary receiver, for which purpose a wireless communication connection based on linearly polarized electromagnetic waves is used, wherein the communication device is formed to transmit a transmission signal with a presettable transmission power for using the communication connection. Finally, the present disclosure also relates to a motor vehicle with a communication device for communicating at least with at least one other motor vehicle or at least one stationary receiver.

BACKGROUND

Communication devices of the generic type, in particular radio-based communication devices, are known in the prior art. Occasionally, they are also referred to as active antenna unit or the like. Among other things, they serve for allowing a communication between vehicles as well as also between stationary receivers, for example infrastructure devices like traffic lights, traffic signs and/or the like, in particular in the manner of a road side unit (RSU). Hereby, traffic networking is to be achieved. The traffic networking can for example include communicative networking of motor vehicles among each other as well as between motor vehicles and the infrastructure devices. Such a traffic networking is also referred to as Car2X (vehicle to everything; V2X) or the like. Moreover, there is traffic networking between motor vehicles (vehicle to vehicle; V2V), motor vehicle to road (vehicle to road; V2R), motor vehicle to infrastructure (vehicle to infrastructure; V2I), motor vehicle to network (vehicle to network; V2N), motor vehicle to person (vehicle to person; V2P) and the like. The traffic networking is to increase the traffic safety, improve the efficiency of the traffic and allow energy savings. Moreover, the traffic networking serves for allowing at least partially autonomous driving.

A traffic networking system or telematics system can for example be CV2X. This is a cellular network, which allows a communication between motor vehicles (PC5) as well as a communication between a motor vehicle and an infrastructure device (Uu). For example, such a telematics system is operated in a frequency range from about 5.905 GHz to about 5.925 GHz. For this purpose, the motor vehicle usually includes the corresponding communication device, which is to allow networking within the scope of the telematics system. The communication device is usually connected to a control device in the motor vehicle, which communicates with the other motor vehicles and/or the infrastructure devices via the communication device. For example, the control device can provide vehicle data of the motor vehicle for other motor vehicles and/or the infrastructure devices. Similarly, the control device can obtain data from other motor vehicles and/or the infrastructure devices to use it for example for guiding the motor vehicle.

Moreover, toll collection systems are known, also called ETC, which provide a wireless toll collection for motor vehicles, which uses a radio-based communication, which uses electromagnetic waves at a frequency of about 5.8 GHz, for example the toll collection system of the company Toll Collect™.

Due to overlapping frequency ranges or also a too low frequency distance, disturbances can occur in the operation of the above mentioned telematics system in connection with the aforementioned toll collection system. In particular, the communication between the motor vehicle, in particular an on-board unit (OBU) for the toll collection (ETC-OBU), and a toll station can be disturbed upon passing the toll station by the motor vehicle, such that a release for the passage at the toll station is denied. This can be caused in that the telematics system transmits a transmission signal with such a great power that the corresponding signal of an on-board unit (OBU) for the toll collection cannot be received or captured on the side of the toll station. For this reason, it is for example provided in Europe that the telematics system is deactivated in the area of a respective toll station on the side of the motor vehicle to be able to perform the communication between the toll station and the ETC-OBU in undisturbed manner. As soon as the toll station is passed, the telematics system is again activated. For this purpose, corresponding position data of the toll stations is present for the telematics system in the motor vehicle, which is matched with a respective current position of the motor vehicle.

However, if position data of the toll stations is not available, the reliable function of the toll collection system cannot be ensured with the aforementioned method. For improving this situation, JP 4944719 B2 for example proposes an antenna unit, which comprises different antenna elements for the telematics system and the toll collection, by which the mutual disturbances are to be able to be reduced. In this respect, an improvement can be achieved on the side of the vehicle, but the problem remains that the toll station can be disturbed by a transmission signal of the communication device such that the intended function of the toll collection is not ensured. Moreover, US 2010/0304680 A1 discloses a method and an apparatus for using a transmission polarization to reduce a disturbance of a primary overlying signal.

DETAILED DESCRIPTION

The present disclosure is based on the object to improve a communication device to the effect that disturbances, which can be caused by transmitting a transmission signal of the communication device at a toll station, can be reduced.

As the solution, a method, a communication device and a motor vehicle according to the independent claims are proposed with the present disclosure.

Advantageous developments are apparent by the features of the dependent claims.

With respect to a generic method, it is in particular proposed with the present disclosure that the transmission power is reduced depending on the reception of a reception signal by the communication device, which uses, with respect to the linearly polarized electromagnetic waves, electromagnetic waves at least partially orthogonally polarized hereto.

With respect to a generic communication device, it is in particular proposed that the communication device is formed to reduce the transmission power depending on a reception of a reception signal, which reception signal uses, with respect to the linearly polarized electromagnetic waves, electromagnetic waves at least partially orthogonally polarized hereto.

With respect to a generic motor vehicle, it is in particular proposed that the communication device is formed according to the present disclosure.

Among other things, the present disclosure is based on the idea that the communication device can recognize when a toll station is in communication range to reduce the transmission power of the transmission signal depending thereon. By the specific reduction of the transmission power, it can be achieved that the toll station is no longer disturbed upon reception of a corresponding communication signal of the ETC-OBU such that the function of the toll collection can be more reliably ensured upon passing the toll station. In contrast to the prior art, neither position data of the toll station nor position data of the motor vehicle is required hereto. Rather, the communication device, which is preferably arranged in the motor vehicle, can recognize that it is in a communication range with a toll station by evaluation of the reception signal. For this purpose, the corresponding reception signal is evaluated by the communication device. Therein, the present disclosure exploits among other things that the telematics system usually uses substantially linearly, in particular vertically, polarized electromagnetic waves for realizing the communication connection. In contrast, the communication connection for the toll collection usually uses circularly polarized electromagnetic waves. It results that the communication connection of the toll collection system or of the toll station uses at least partially horizontally polarized electromagnetic waves. This can be ascertained by a correspondingly formed communication device.

Thus, the communication device, in particular the reception unit thereof, can comprise a corresponding antenna unit, which allows being able to separately receive linearly, in particular vertically, polarized electromagnetic waves and electromagnetic waves orthogonally, in particular horizontally, polarized hereto. By evaluating the corresponding electrical signals provided by the corresponding antenna unit adapted for the horizontally polarized electromagnetic waves, it can thus be ascertained if a toll station is in communication range. As soon as a toll station in communication range is determined, the transmission power for a transmission signal of the communication device for the CV2X communication can then be correspondingly reduced such that the communication connection to the toll station can preferably be substantially completely undisturbed.

The reduction of the transmission power can include an adapted reduction such that the communication connection between the ETC-OBU on the motor vehicle side and the toll station can be reliably established. However, the reduction of the transmission power can moreover also include switching off a transmission device of the communication device. Overall, there is thus the possibility that the function of the communication device can be adapted with respect to the transmission of a transmission signal independently of any position data by the communication device according to the present disclosure such that the communication between the toll station and the ETC-OBU can be substantially undisturbed realized. As a result, databases with corresponding data of the toll stations either do not have to be kept available.

For realizing the communication within the scope of the telematics system, the communication device can include a high-frequency circuit arrangement, which is suitable to demodulate and/or to decode antenna signals provided by the antenna unit and optionally to provide them to the control device of the motor vehicle via an attenuation circuit, a filter circuit and/or the like. In reverse, the communication device can serve for supplying data from the control device to the high-frequency circuit arrangement for example also via the filter circuit and/or the attenuation circuit to be able to supply a corresponding high-frequency signal to the antenna unit. For this purpose, the high-frequency circuit arrangement can be coupled to a power measuring unit or a power measuring circuit, by means of which a reception power of the antenna signal can for example be ascertained. By means of a control unit, to which the power measuring unit or the power measuring circuit is connected, a transmission power of a transmission signal to be transmitted can be ascertained and/or adjusted. The power measuring circuit can be coupled to the control unit in terms of communication or signaling. For this purpose, the control unit is connected to the attenuation circuit, the attenuation of which can be adjusted in suitable manner by the control unit. The aforementioned elements are preferably a constituent of the communication device. Thus, the communication device serves for establishing the communication connection between the control unit on the vehicle side and at least the at least one other motor vehicle or the at least one stationary receiver to be able to realize the desired traffic networking.

Preferably, the communication device also includes the aforementioned antenna unit. Therein, the high-frequency circuit arrangement is preferably coupled to an antenna element of the antenna unit in terms of signaling, which serves for transmitting and/or receiving linearly, in particular vertically, polarized electromagnetic waves.

Further, the antenna unit comprises an antenna element, which serves for receiving horizontally polarized electromagnetic waves. This antenna element is preferably connected to a power combiner, to which the other antenna element is also connected. The power combiner combines the antenna signals of the two antenna elements and provides a power signal to a further power measuring unit or further power measuring circuit, which ascertains the power of the combined signal of the power combiner. The power ascertained in this manner is provided to the control unit and evaluated by it. Since this power is dependent on the horizontally polarized electromagnetic waves among other things, it can thus be ascertained if horizontally polarized electromagnetic waves are received. Then, this is to be taken as an evidence that a toll station is in communication range or not. Thus, the control unit can ascertain from it if a toll station is in communication range, and if such a toll station in communication range is detected, reduce the transmission power depending hereon. The control unit can realize it by correspondingly controlling the attenuation circuit.

Thus, the present disclosure does not respond with respect to the reception on the communication device side or on the motor vehicle side, but rather affects the transmission power of the transmission signal depending on the reception of the reception signal. Thereby, there is the possibility of acting on the function of the toll station by the communication device and thus of improving or allowing anyway a reliable communication between the toll station and the ETC-OBU.

At the beginning of the establishment of the communication connection, the transmission signal can be transmitted by the communication device. Moreover, the transmission signal can also be transmitted at a later point of time during the continuation of the communication connection. Finally, there is also the possibility of transmitting more than one transmission signal by the communication device during the communication connection. The communication connection is not restricted to the transmission of the transmission signal. Preferably, the communication connection also includes reception of a reception signal. Thereby, a bidirectional communication connection can be established between the communication device and the other motor vehicle and the stationary receiver, respectively. However, the communication connection can basically also be unidirectional and only be formed for transmitting one or more transmission signals. However, the present disclosure is not restricted hereto. Nevertheless, the present disclosure provides that the process management according to the present disclosure can also be provided in an aforementioned unidirectional communication connection, namely preferably not to disturb for example a reception unit of the toll station in receiving a transmission signal of the ETC-OBU.

For example, the present disclosure can be employed in a frequency range between about 1 GHz and about 20 GHz. However, it is not restricted to this frequency range. Basically, the present disclosure can also be employed in comparable communication manipulations, in which an external reception site could be disturbed by a transmission signal.

Further, the transmission power is reduced if a reception power of the reception signal is greater than a preset comparative value. This has the advantage that the transmission power does not have to be reduced at any reception power. Preferably, it is only intervened if a significant reception power for horizontally polarized waves is ascertained. Thus, a significance criterion can be preset by the preset comparative value, which serves to be able to operate the communication via the communication connection in undisturbed manner as long as possible. Thus, the comparative value can be ascertained and preset based on empiric, previously performed function measurements.

Furthermore, it is proposed that a value of the transmission power is reduced depending on a value of the reception power of the reception signal. This allows being able to individually respond to present conditions in a current communication via the communication connection. Therein, the realization can be taken into account that with a larger distance between the toll station and the motor vehicle, a comparatively low reduction of the transmission power can already realize the reliable function of the communication between the toll station and the ETC-OBU. With increasing approach to the toll station, however, the transmission power of the transmission signal acts on the reception unit of the toll station and can entail a disturbance. Therefore, it can perhaps be ascertained for example from the reception power how much the transmission power should preferably be reduced in order that the function of the communication connection between the toll station and the ETC-OBU can further be maintained. This configuration moreover has the advantage that the communication connection for example does not have to be interrupted. Depending on the spatial conditions, a continuous use of the communication connection can perhaps even be maintained.

The linearly polarized electromagnetic waves are vertically polarized electromagnetic waves and the electromagnetic waves orthogonally polarized hereto are at least partially horizontally polarized electromagnetic waves, wherein a horizontal reception power of a horizontal reception signal part of the reception signal and a vertical reception power of a vertical reception signal part of the reception signal are captured and evaluated to ascertain the reception power. Preferably, the capture of the reception signal parts is effected separately from each other, for example by means of correspondingly formed antenna elements of the antenna unit. For this purpose, the antenna elements can be correspondingly formed and/or oriented for the reception of the respective polarization of the reception signal part. This allows not only basically separately capturing a horizontal reception signal part for example to be able to ascertain and recognize horizontally polarized electromagnetic waves or circularly polarized electromagnetic waves, but it moreover also allows determining if a circularly polarized reception signal is present within the scope of the corresponding additional evaluation of the vertical reception signal part. Thereby, the present disclosure can of course especially also be employed if a communication connection based on circularly polarized electromagnetic waves for example exists between the ETC-OBU and the toll station.

Moreover, a phase of the horizontal reception signal part is adjusted. This allows that propagation time differences, which can occur due to the capture and/or evaluation of the reception signal parts by the communication device, can be compensated for such that a reliable functionality can be improved.

Furthermore, it is proposed that the reception power is generated from the horizontal reception power and the vertical reception power by means of a power combiner. Thereby, the actual reception power can be ascertained in particular with reception signals, which use circularly polarized electromagnetic waves. Thereby, the function of the communication device can be further improved. Moreover, a simple realization for ascertaining the reception power of the reception signal can be achieved with the power combiner to for example be able to provide a control signal derived from it for the control unit of the communication device. Thus, the control unit can correspondingly control the high-frequency circuit arrangement and/or the attenuation circuit in simple manner to be able to preferably permanently ensure the reliability of the communication between the toll station and the ETC-OBU. Moreover, it can perhaps also be derived from the reception power, which current distance exists between the motor vehicle and the toll station. This can be used for the further functionality of the present disclosure and/or also for a superordinated vehicle control, in particular the control device.

It is ascertained if the reception signal uses circularly polarized electromagnetic waves. For this purpose, the vertical and the horizontal reception signal part, in particular the horizontal reception power and the vertical reception power, can be evaluated. By considering the horizontal reception power, it can be ascertained if the vertical signal part, besides a portion, which originates from exclusively vertically polarized electromagnetic waves, includes a further portion, which is caused by circularly polarized electromagnetic waves. Therefore, by corresponding evaluation, it can thus be determined if the reception signal uses circularly polarized electromagnetic waves. This is in particular convenient for the case, in which the toll station uses circularly polarized electromagnetic waves for the communication connection to the ETC-OBU. Thereby, signals of the toll station can be well distinguished from signals of the communication connection of the communication device, which substantially use exclusively vertically polarized electromagnetic waves. Preferably, the evaluation can be effected by the control unit. However, there is basically also the possibility of at least partially providing a corresponding hardware circuit, which at least partially realizes the corresponding evaluations.

With respect to the communication device, it is further proposed that the communication device is formed to be communicatively coupled to a control device, capable of being arranged in the motor vehicle, of a wireless toll collection system, in particular the ETC-OBU, and to use an antenna unit of this control device for establishing the communication connection. This configuration has the advantage that the communication device does not require a separate antenna unit. By the process management according to the present disclosure, it can be achieved that the communication device and the ETC-OBU can realize their respective communication connections in nearly undisturbed manner such that the respective reliable function can also be realized. Thereby, the effort for the communication device can be reduced.

Thus, an interference problem can be solved by the present disclosure such that the coexistence of the two aforementioned systems can be achieved in substantially undisturbed manner. By an integration of an additional detection circuit for horizontally polarized electromagnetic waves, in particular for circularly polarized electromagnetic waves, preferably of a toll system, in the communication device or a CV2X compensator, the present disclosure allows that the communication device can in particular detect the circularly polarized reception signal of the toll station and can adapt its amplification for its own transmission signals such that a system-critical interference between the toll system and the CV2X infrastructure can be largely avoided. The coexistence problem between CV2X systems and the toll systems, in particular ETC toll systems, such as for example in China, can be solved. Expensive and costly measures with respect to the communication device and the already present infrastructure, in particular in the toll systems, preferably with respect to the RSU and the ETC-OBU, do not have to be performed. Further, corresponding filters for ensuring the coexistence do not have to be provided. The detection circuit according to the present disclosure can be integrated in the communication device in simple manner.

The communication device for the motor vehicle also belongs to the present disclosure. The communication device, in particular the control unit, can comprise a data processing device or a processor device, which is at least partially encompassed by the control unit of the communication device and which is configured to perform an embodiment of the method according to the present disclosure. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured to perform the embodiment of the method according to the upon execution by the processor device. The program code can be stored in a data storage of the processor device.

Developments of the communication device according to the present disclosure, which comprise features as they have already been described in context of the developments of the method according to the present disclosure, also belong to the present disclosure. For this reason, the corresponding developments of the communication device according to the present disclosure are not again described here.

The motor vehicle according to the present disclosure is preferably configured as a car, in particular as a passenger car or truck, or as a passenger bus or motor cycle.

The present disclosure also includes the combinations of the features of the described embodiments.

The embodiments explained in the following are preferred embodiments of the present disclosure. In the embodiments, the described components of the embodiments each represent individual features of the present disclosure to be considered independently of each other, which also each develop the present disclosure independently of each other. Therefore, the disclosure is to include also combinations of the features of the embodiments different from the illustrated ones. Furthermore, the described embodiments can also be supplemented by further ones of the already described features of the present disclosure.

In the figures, identical reference characters each denote functionally identical elements.

Figure 1:
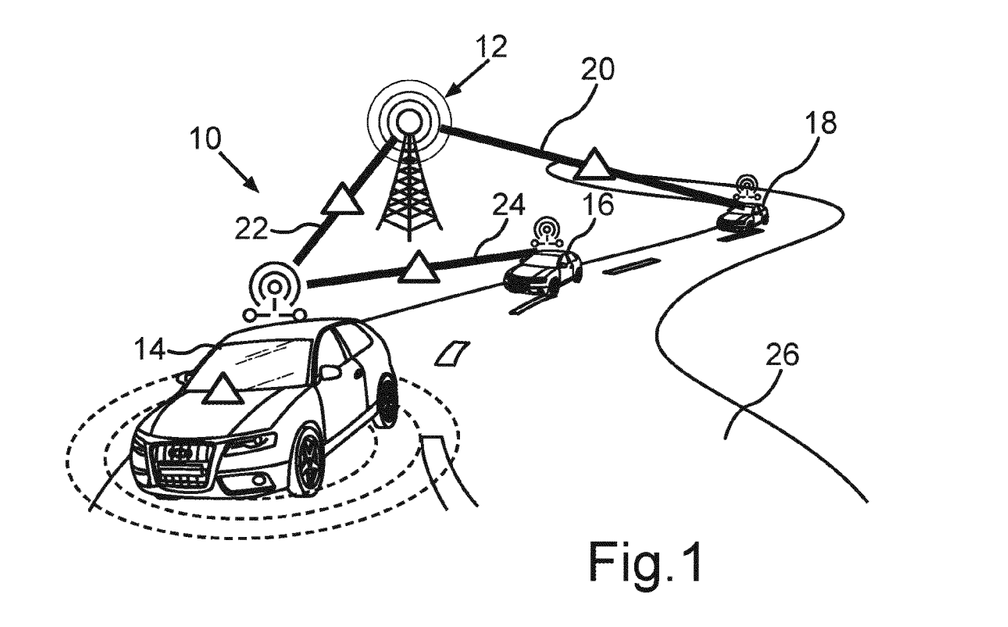
FIG. 1 is a schematic perspective view of three motor vehicles and an RSU of a traffic networking system.

FIG. 1 shows a traffic networking system 10 as well as three motor vehicles 14, 16, 18, which travel on a road 26, in a schematic view. An RSU 12 as a stationary receiver is fixedly positioned besides the road 26. Each of the motor vehicles 14, 16, 18 comprises a control device or a CV2X-OBU 30 with a communication device 32, 34 (FIG. 2, 4), by means of which each of the motor vehicles 14, 16, 18 can communicate with the respectively other one of the motor vehicles 14, 16, 18 or alternatively or additionally also with the stationary receiver 12. For this purpose, a respective wireless communication connection 20, 22, 24 based on vertically polarized electromagnetic waves is used.

Presently, the traffic networking system 10 is formed as a telematics system based on CV2X. It is a cellular network, which allows the communication between vehicles (PC5) as well as a communication between a respective one of the motor vehicles 14, 16, 18 and a respective infrastructure device, here the RSU 12. In FIG. 1, these communication connections are 20, 22 (Uu). In the present case, it is provided that a frequency range for the communication connections 20, 22, 24 ranges from about 5.905 GHz to about 5.925 GHz. Preferably, this frequency range is tailored to the requirements of automobile applications. The communication connection 24 is a communication connection between the motor vehicle 14 and the motor vehicle 16.

Within the scope of using the communication connection 20, 22, 24, a transmission signal is provided by the CV2X-OBU 30, which is transmitted with a preset transmission power by means of the communication device 32, 34.

Presently, the traffic networking system 10 is formed as a telematics system according to CV2X. It is a cellular network, which allows the communication between vehicles (PC5) as well as a communication between a respective vehicle and a respective infrastructure device, here the RSU 12. In FIG. 1, these communication connections are 20, 22 (Uu). In the present case, it is provided that a frequency range for the communication connections 20, 22, 24 ranges from about 5.905 GHz to about 5.925 GHz. This frequency range is preferably tailored to the requirements of automobile applications. The communication connection 24 is a communication connection between the motor vehicle 14 and the motor vehicle 16.

Figure 2:
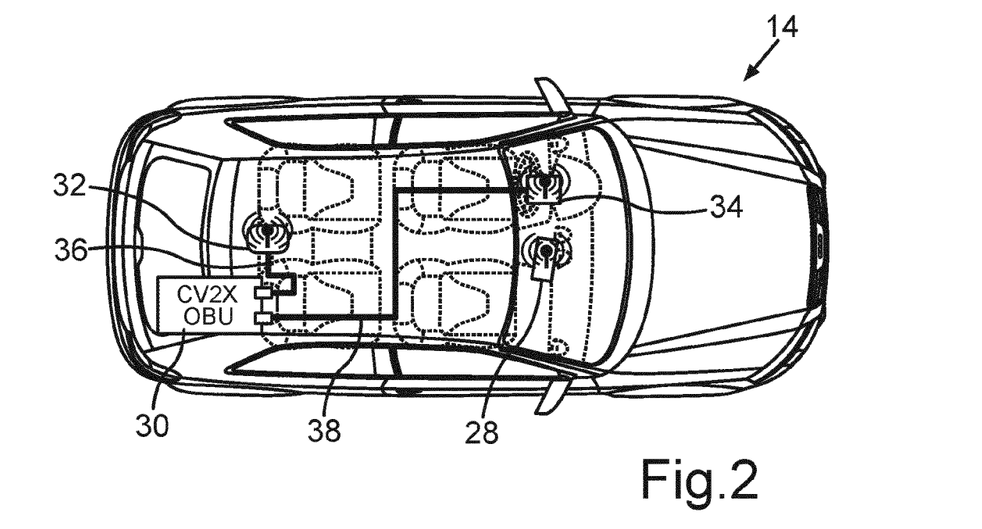
FIG. 2 is a schematic plan view of one of the motor vehicles in FIG. 1 with a communication device for the traffic networking system and an ETC-OBU for a toll collection system.

FIG. 2 shows one of the motor vehicles according to FIG. 1 in a schematic plan view, namely presently the motor vehicle 14. Presently, the two further motor vehicles 16, 18 are substantially comparably formed. According to construction, however, they can also be formed varying.

The motor vehicle 14 comprises the control device 30, which is also referred to as CV2X-OBU in the following. The control device 30 is connected to respective active antenna units or communication devices 32, 34 via respective antenna lines 36, 38. The control device 30 can both transmit and receive radio signals via the communication devices 32, 34. Hereby, the communication connections 20, 22, 24 can be realized. In order to allow a good communication connection, the communication device 32 is arranged on a roof of the motor vehicle 14 as a CV2X antenna unit with compensator. The other communication device 34 is presently arranged in a mirror base below a windscreen of the motor vehicle 14.

Figure 5:
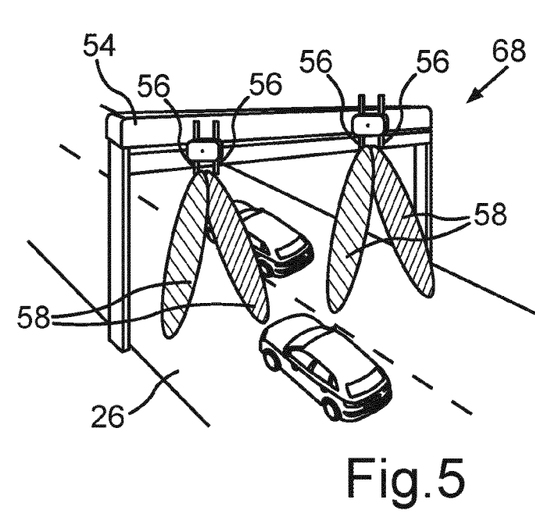
FIG. 5 is a schematic perspective view, a toll station of a toll collection system at a four-lane road as well as radio connection ranges of transmission/reception devices of the toll station for capturing ETC-OBUs of passing motor vehicles.

It is further apparent that an ETC-OBU 28 is arranged in the upper area on the windscreen, which is part of a toll collection system 68 (FIG. 5). The toll collection system 68 is a satellite-assisted toll collection system, which serves for ascertaining a toll depending on the use of the road 26.

In order to improve the overall performance of the traffic networking system 10 or the CV2X system in the motor vehicle 14, it is presently provided to balance or at least partially compensate for an attenuation of the antenna lines 36, 38. The active antenna units or the communication devices 32, 34, also called CV2X compensators, serve for this purpose. Presently, they can amplify corresponding signals both in the transmission and in the reception operation. Presently, vertically polarized electromagnetic waves are employed for the communication connections 20, 22, 24. The amplification by the communication devices 32, 34 can be adjusted independently of each other in the transmission operation and in the reception operation. Usually, a maximum transmission power of about 23 dBm at a base point of a corresponding antenna element of the communication device 32, 34 is sought for the transmission operation. The communication devices 32, 34 each comprise at least one corresponding antenna element, by which the transmission and reception of vertically polarized electromagnetic waves can be realized.

Figure 3:
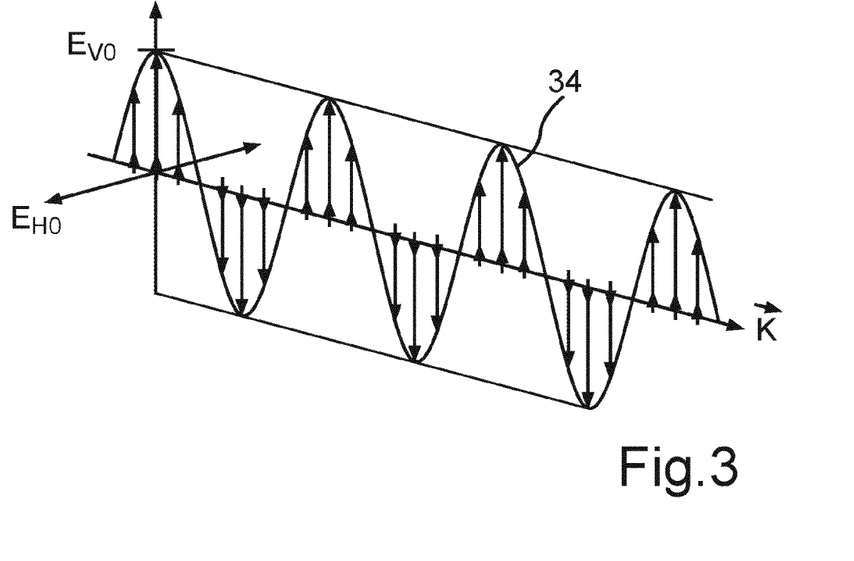
FIG. 3 is a schematic diagram representation, an electrical field vector of a linearly vertically polarized electromagnetic wave.

FIG. 3 shows an electrical field vector of a linearly vertically polarized electromagnetic wave with a graph 34 in a schematic diagram representation. An abscissa is associated with the propagation direction K. The ordinate is associated with the electrical field strength. An amplitude of the field strength vector is denoted by $E_{V0}$.

Figure 4:
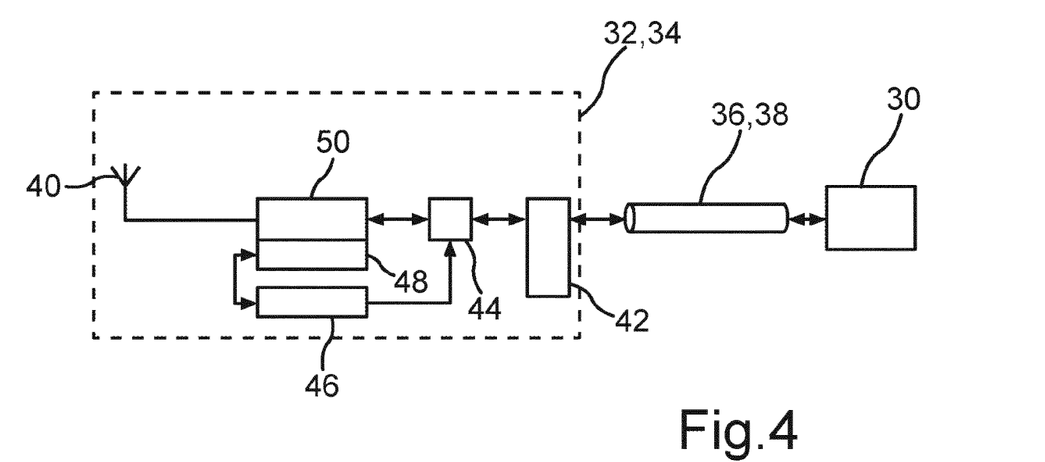
FIG. 4 is a schematic block diagram representation, the communication device for the traffic networking system according to FIG. 2.

FIG. 4 shows a communication device or active antenna unit 32, 34, as it is used for the traffic networking system 10, in a schematic block diagram representation. The communication device 32, 34 comprises an antenna element 40, which is formed to transmit and/or receive vertically polarized electromagnetic waves. The antenna element 40 is connected to a high-frequency circuit arrangement 50, which provides a corresponding electrical signal for the antenna element 40 in the transmission operation. In the reception operation, the high-frequency circuit arrangement 50 provides a corresponding amplification and processing of the reception signal.

The high-frequency circuit arrangement 50 is further connected to an adjustable attenuation circuit 44. With the adjustable attenuation circuit 44, an attenuation can be adjusted depending on a corresponding control signal both in the transmission operation and in the reception operation. Further, the attenuation circuit 44 is connected to a filter circuit 42. The filter circuit 42 in turn is then connected to the respective one of the antenna lines 36, 38, via which the communication device 32, 34 is communicatively connected to the CV2X-OBU 30. Therefore, the communication device 32, 34 is formed adapted to transmission/reception signals according to FIG. 3 and provides corresponding signals for the control device 30. Moreover, corresponding signals for transmission by the communication device 32, 34 can be provided via it.

The high-frequency circuit arrangement 50 is further coupled to a power measuring circuit 48, by means of which a reception power and a transmission power, respectively, can be captured. The power measuring circuit 48 is connected to a control unit 46 of the communication device 32, 34, which is presently formed by a microcontroller. The control unit 46 provides the control signal for the attenuation circuit 44, wherefore the control unit 46 is connected to the attenuation circuit 44. For controlling the amplification to a preset value of for example about 15 dB, the attenuation circuit 44 can be correspondingly adjusted by means of the control unit 46.

Basically, the traffic networking system 10 has to be able to function in a coexistence with a toll collection system like the toll collection system 68 according to FIG. 5. As is apparent from FIG. 2, the motor vehicle 14 therefore also includes a corresponding ETC-OBU 28, which is a part of the toll collection system 68. Presently, the ETC-OBU 28 is substantially a type of transponder or active antenna, which usually is to be arranged on the windshield of the motor vehicle 14, 16, 18.

Figure 6:
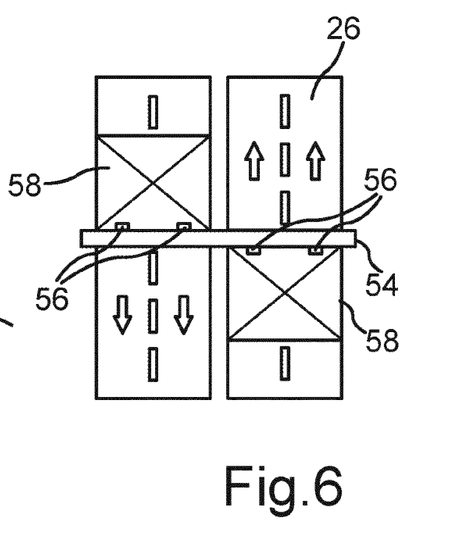
FIG. 6 is a schematic plan view to the toll station according to FIG. 5.

FIG. 5 shows a toll station 54 of the toll collection system 68 at a road 26 formed four-lane as well as lobe-shaped radio connection ranges 58 of transmission/reception devices 56 of the toll station 54 in a schematic perspective view. Presently, it is provided that a respective radio connection range 58 is correspondingly oriented for a respective roadway of the four-lane road 26. Thereby, a wireless communication for toll collection can be realized for each of the lanes of the road 26. FIG. 6 shows a schematic plan view to the toll station 54 according to FIG. 5. FIG. 6 shows that the radio connection ranges extend over a distance of about 10 m in front of the toll station 54 in direction of travel. Further, the radio connection ranges 58 are correspondingly formed across the entire width over a respective roadway of the road 26.

In passing the toll station 54, the ETC-OBU 28 communicates with the toll station 54 via a communication connection of a respective radio connection range 58. Via this communication connection, a respective payment process of the toll collection system 68 is transacted in the area also called tolling zone. This requires that an undisturbed data exchange or an undisturbed communication connection between the respective ETC-OBU 28 and the corresponding transmission/reception device 56 has to be realized at least in the tolling zone.

Figure 7:
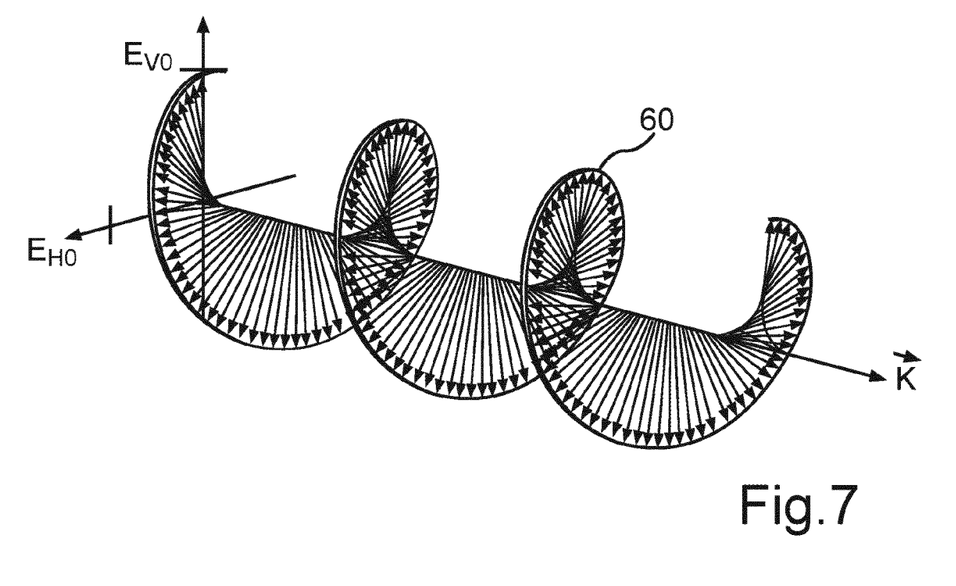
FIG. 7 is a schematic diagram representation, an electrical field vector of a left-hand circularly polarized electromagnetic wave.
Figure 8:
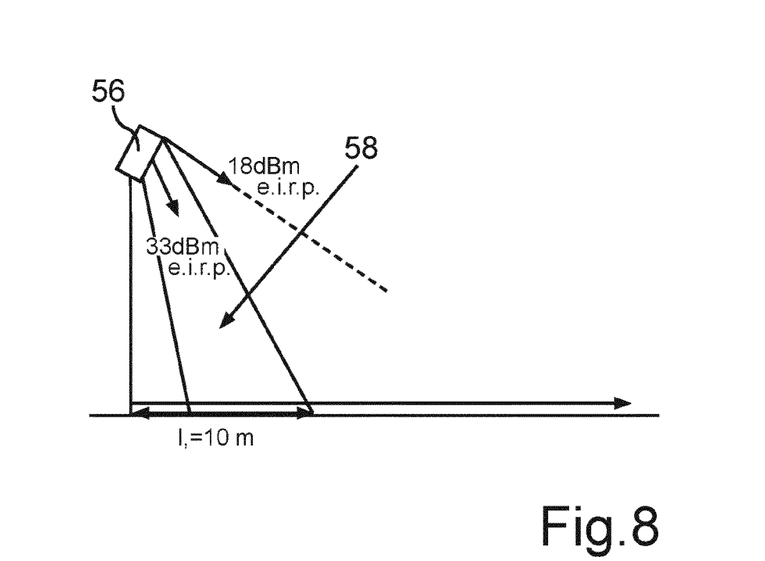
FIG. 8 is a schematic side view, a section of the toll station according to FIG. 5 with a communication range of a transmission/reception device of the toll station.

For realizing the communication of the toll collection system 68, circularly polarized electromagnetic waves are used. The frequency range used herein is at about 5.8 GHz. FIG. 7 shows an electrical field vector of a left-hand circularly polarized electromagnetic wave with a graph 60, as it is transmitted by the transmission/reception devices 56 of the toll station 54, in a schematic diagram representation like FIG. 3. Typical characteristics of a corresponding antenna unit of the transmission/reception device 56 are illustrated in a schematic side view of a section of the toll station 54 according to FIG. 5. In a main descent direction, an E.I.R.P of about 33 dBm is achieved (FIG. 8). Therein, a main lobe of the antenna unit of the transmission/reception device 56 illuminates the tolling zone.

With a left-hand circular polarization of the electromagnetic waves according to FIG. 7, the field strength vector rotates left-hand perpendicularly to the propagation direction K. A circular polarization can be achieved by linearly polarized antenna elements fed 90° out of phase and offset by 90° at the same time. Therein, the amplitudes of two such linear components are substantially of equal magnitude and result as follows:

$$\vec{E} = \begin{pmatrix} E_{H0} \cdot \cos(kz - \omega t) \\ -E_{V0} \cdot \sin(kz - \omega t) \\ 0 \end{pmatrix}$$

$$E_0 = E_{H0} = E_{V0}$$

$$k = \frac{2\pi}{\lambda}; \omega = 2\pi f;$$

In the practical use, the toll collection system 68 has to be able to be operated simultaneously with the traffic networking system 10. As is apparent from the aforementioned, interference phenomena or disturbances of the two systems can occur at least in the area of the tolling zone. An essential reason for this is the low frequency distance between the use frequency spectra of CV2X and ETC, which is presently less than 100 MHz. Therefore, it is to be assumed that transmission signals of the communication device 32, 34 can disturb the transmission/reception device 56 of the toll station 54 in particular in reception, whereby the corresponding communication connection to the ETC-OBU 28 can be disturbed. At present, suitable filter devices are not available, by which a corresponding decoupling or selectivity could be achieved.

Figure 9:
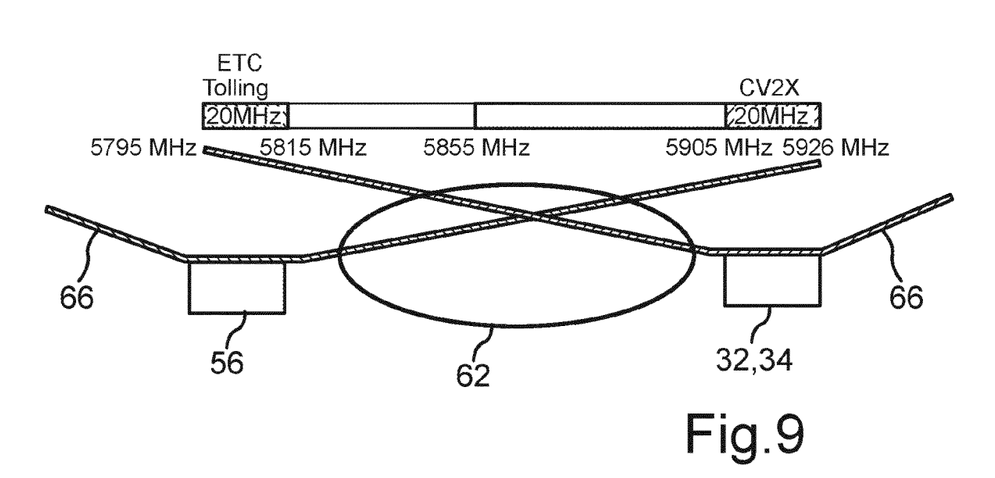
FIG. 9 is a schematic representation, a coexistence consideration of CV2X and ETC based on respective use frequency spectra.

FIG. 9 shows the problem with respect to the interference and coexistence problems, respectively. In a schematic representation within the scope of a coexistence consideration of CV2X and ETC based on respective use frequency spectra. In an upper area of FIG. 9, a frequency bar diagram is illustrated, which shows that ETC uses a frequency range of 5.795 GHz to 5.815 GHz illustrated in the left area, whereas CV2X uses a frequency range of 5.095 GHz to 5.925 GHz illustrated in the right area.

A transmission/reception device 56 and a communication device 32, 34 are schematically illustrated below, at which a filter function is illustrated respectively schematically arranged, which uses a usual good filter 66. It is apparent that both the transmission/reception device 56 and the communication device 32, 34 can each be applied with significant signal portions of the respectively other system despite of the filter 66. A range results from it, in which interference and coexistence problems, respectively, can occur. This range is denoted by 62 in FIG. 9.

Figure 10:
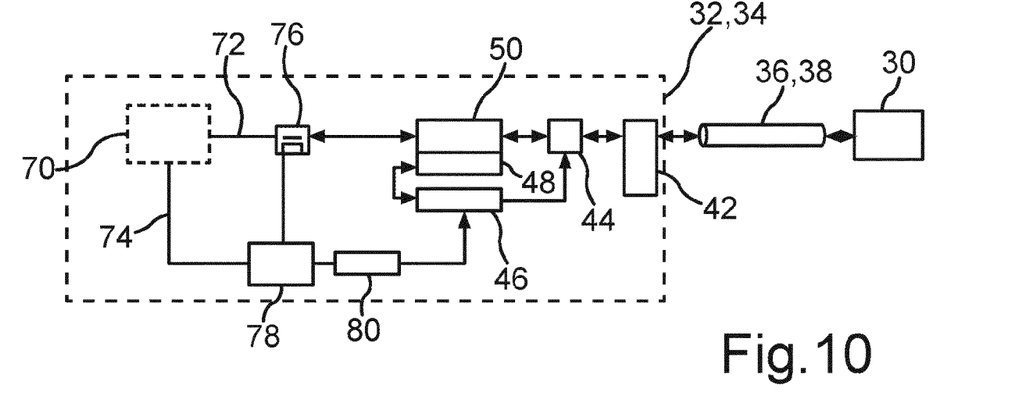
FIG. 10 is a schematic block diagram representation, the communication device according to FIG. 4 with a first configuration of a supplementary detection circuit for detecting circularly polarized electromagnetic waves.

FIG. 10 now shows the communication device 32, 34 or the active respective antenna unit in a schematic block diagram representation according to a first configuration, which comprises a supplementary detection circuit for detecting circularly polarized electromagnetic waves. Basically, this configuration is based on the configuration explained to FIG. 4, wherefore reference is additionally made to the explanations in this respect.

In contrast to the configuration according to FIG. 4, a detection circuit for circularly polarized electromagnetic waves is provided, which includes an antenna unit 70, which comprises two non-illustrated antenna elements, wherein a first one of the two antenna elements serves for transmitting and receiving, respectively, vertically polarized electromagnetic waves, whereas a second antenna element of the two antenna elements serves for transmitting and/or receiving horizontally polarized electromagnetic waves. The first antenna element is connected to a first communication line 72, which is connected to the high-frequency circuit arrangement 50 via a signal divider 76. The second one of the antenna elements is connected to a power combiner 78 via a communication line 74. The power combiner is also connected to the signal divider 76. Thus, a horizontal reception power of a horizontal reception signal part of the reception signal and a vertical reception power of a vertical reception signal of the reception signal are available for the power combiner 78. By combination in the power combiner 78, a suitable superposition of these powers can be realized.

Further, the power combiner 78 is connected to a power measuring circuit 80, which measures the superimposed reception power and transfers a corresponding value to the control unit 46. Thereby, it is possible that a value of the reception power of the reception signal is ascertained and can be used by the control unit 46 to adjust the attenuation circuit 44 such that the transmission power is reduced depending on a value of the reception power of the reception signal. Therein, the adjustment is preferably selected such that the communication connection between the transmission/reception device 56 and the ETC-OBU 28 can in particular be realized in undisturbed manner. For this purpose, corresponding parameters or table values can for example be provided, which allow ascertaining a value for the transmission power depending on the value of the reception power. Thereby, the interference or disturbance problem can be reduced or even solved. The aforementioned components of the detection circuit can be at least partially integrated in the communication device 32, 34.

Thus, the concept provides that the detection circuit can capture and evaluate the circularly polarized signal of the toll station 54. For this purpose, the antenna unit 70 comprises dually polarized passive antenna elements, which allow achieving a sufficient polarization decoupling. Therein, a relative bandwidth of 4 to 5% can be realized both for the toll collection system 68 and for the traffic networking system 10. The antenna unit 70 supports the linear vertical polarization and the linear horizontal polarization. The reception signal with respect to CV2X is received via the antenna element of the antenna unit 70, which is formed for the vertical polarization. As explained based on FIG. 4—it is amplified and supplied to the control device 30 via the respective antenna line 36, 38. In the transmission operation, the CV2X signal provided by the control device 30 is supplied to the communication device 32, 34 via the antenna line 36, 38, there amplified in suitable manner and transmitted via the antenna element of the antenna unit 70 provided for the vertical polarization.

In contrast, a signal of the toll collection system 68 is received via both antenna elements of the antenna unit 70. Via the power combiner 78, which can for example be formed by an adaptation line, a constructive superposition of the horizontal reception signal part and the vertical reception signal part of the reception signal can be achieved. This is performed in phase. The power measuring circuit 80 then ascertains the reception power of the reception signal, which is presently the circularly polarized signal of the transmission/reception device 56. Depending on the value of the reception power, the control unit 46 adjusts the attenuation circuit 44. Thereby, the transmission power is reduced depending on the reception of the reception signal by the communication device if the reception signal uses at least partially horizontally polarized electromagnetic waves.

Figure 11:
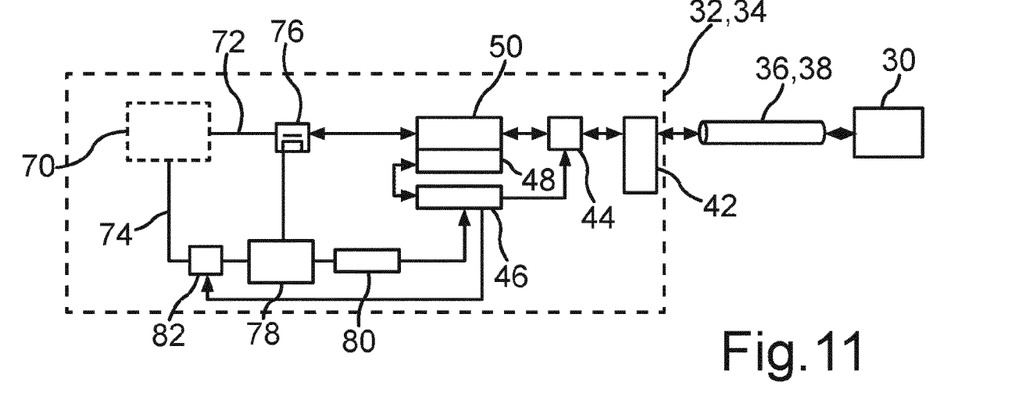
FIG. 11 is a schematic block diagram representation, the communication device according to FIG. 4 with a second configuration of a supplementary detection circuit for detecting circularly polarized electromagnetic waves.

FIG. 11 shows in a further schematic block diagram representation like FIG. 10 a second configuration, which is based on the first configuration according to FIG. 10 as well as according to FIG. 4, wherefore only the differences to FIG. 10 are explained in the following.

In contrast to the first configuration according to FIG. 10, the second configuration according to FIG. 11 has an adjustable phase shifter circuit 82 at the detection circuit, the phase shift of which can be adjusted by a control signal of the control unit 46. For this purpose, the phase shifter circuit 82 is connected to the control unit 46. The phase shifter circuit 82 is looped in the communication line 74 between the antenna unit 70 and the power combiner 78. Thereby, the phase of the horizontal reception signal part of the reception signal can be shifted depending on a corresponding control signal of the control unit 46. This allows dynamically changing the horizontally polarized component of the ETC signal. By constructive interference, thus, a maximum value of the reception power of the reception signal can be detected by means of the power measuring circuit 80 by the power combiner 78. With a destructive interference, cancellation by the power combiner 78 can occur such that the power measuring circuit 80 substantially does not measure a power. By adding the phase shifter circuit 82, the robustness of the detection circuit can overall further be improved.

Figure 12:
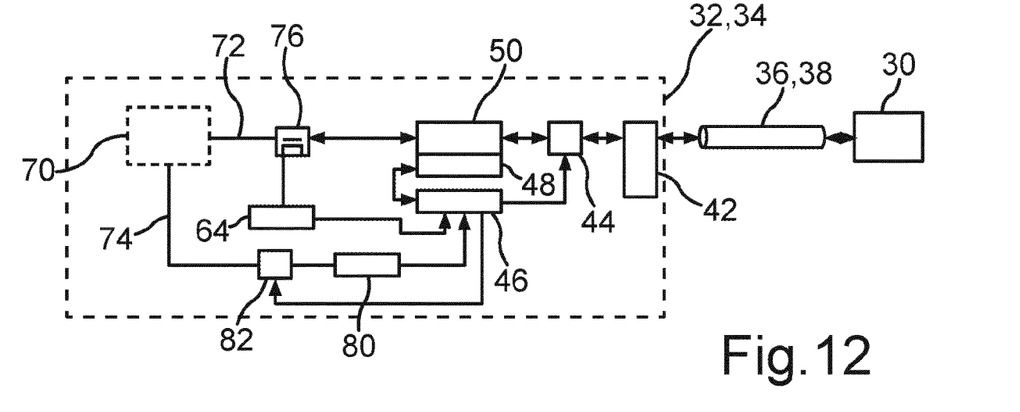
FIG. 12 is a schematic block diagram representation, the communication device according to FIG. 4 with a third configuration of a supplementary detection circuit for detecting circularly polarized electromagnetic waves.

FIG. 12 shows a further schematic block diagram representation for a communication device according to a third configuration, which is also based on the first configuration according to FIG. 10, wherefore reference is additionally made to the explanations to FIG. 10 as well as also to FIG. 4 in this respect. In the following, only the differences with respect to FIG. 11 are explained.

In contrast to the second configuration according to FIG. 11, the detection circuit according to the configuration according to FIG. 12 includes two power measuring circuits 64, 80 instead of the power combiner 78, which are each separately connected to the control unit 46 and provide corresponding power measuring signals to the control unit 46. The first power measuring circuit 64 is connected to the signal divider 76 and measures a vertical reception power of the vertical reception signal part of the reception signal. The second power measuring circuit 80 is connected to the phase shifter circuit 82 and measures a horizontal reception power of the horizontal reception signal part of the reception signal. In this case, the control unit 46 is formed to evaluate and correspondingly process the powers ascertained by the power measuring circuits 64, 80 to ascertain therefrom if and optionally with which strength a circularly polarized reception signal of a toll collection system 68 is present. Depending hereon, the attenuation circuit 44 can then be adjusted with respect to its attenuation.

Even if the embodiments relate to vertically and horizontally polarized electromagnetic waves, however, the present disclosure is not restricted hereto. Of course, other linearly polarized electromagnetic waves can take the place of the vertically polarized electromagnetic waves. Correspondingly, electromagnetic waves orthogonally polarized to the linearly polarized electromagnetic waves can of course take the place of the horizontally polarized electromagnetic waves. In particular, these electromagnetic waves only have to be partially orthogonally polarized, such as for example with circularly polarized electromagnetic waves or the like. The antenna unit can be correspondingly formed. Thus, the antenna unit can comprise at least one first antenna element, which is formed and/or oriented adapted to linearly polarized electromagnetic waves. Moreover, the antenna unit can comprise at least one second antenna element, which is formed and/or oriented adapted orthogonally to the first antenna element.

The embodiments exclusively serve for explaining the present disclosure and are not intended to restrict it.

The invention claimed is:

1. A method for operating a communication device of a motor vehicle, the method comprising:
   communicating, by the communication device, with at least one other motor vehicle and at least one stationary receiver, using a wireless communication connection based on linearly polarized electromagnetic waves;
   transmitting, by the communication device, a transmission signal with a preset transmission power for using the wireless communication connection;
   reducing the preset transmission power depending on a reception of a reception signal by the communication device, wherein the communication device uses electromagnetic waves at least partially orthogonally polarized with respect to the linearly polarized electromagnetic waves and, wherein the linearly polarized electromagnetic waves are vertically polarized electromagnetic waves and the electromagnetic waves orthogonally polarized hereto are at least partially horizontally polarized electromagnetic waves;
   capturing and evaluating of reception signal parts of the reception signal to ascertain if the reception signal uses circularly polarized electromagnetic waves, the reception signal parts including a horizontal reception power of a horizontal reception signal part of the reception signal and a vertical reception power of a vertical reception signal part of the reception signal;
   adjusting a phase of the horizontal reception signal part to compensate for propagation time differences, wherein the time differences occur due to the capture and/or the evaluation of the reception signal parts by the communication device; and reducing the preset transmission power when a reception power of the reception signal is greater than a preset comparative value.

2. The method of claim 1, further comprising:
reducing a value of the preset transmission power depending on a value of the reception power of the reception signal.

3. The method of claim 1, further comprising:
generating the reception power from the horizontal reception power and the vertical reception power by means of a power combiner.

4. A communication device located in a motor vehicle, wherein the communication device is configured to:
communicate at least with one other motor vehicle or at least one stationary receiver, for which purpose a wireless communication connection based on linearly polarized electromagnetic waves is used;
transmit a transmission signal with a preset transmission power when using the wireless communication connection;
reduce the preset transmission power depending on a reception of a reception signal, wherein the reception signal uses electromagnetic waves at least partially orthogonally polarized, with respect to the linearly polarized electromagnetic waves, and wherein the linearly polarized electromagnetic waves are vertically polarized electromagnetic waves and the electromagnetic waves orthogonally polarized hereto are at least partially horizontally polarized electromagnetic waves;
ascertain if the reception signal uses circularly polarized electromagnetic waves;
if it is ascertained that the reception signal uses the circularly polarized electromagnetic waves, capture and evaluate reception signal parts of the reception signal, the reception signal parts being a horizontal reception power of a horizontal reception signal part of the reception signal and a vertical reception power of a vertical reception signal part of the reception signal to ascertain a reception power of the reception signal;
adjust a phase of the horizontal reception signal part to compensate for propagation time differences that occur due to the capture and/or the evaluation of the reception signal parts by the communication device; and
reduce the preset transmission power if the reception power of the reception signal is greater than a preset comparative value.

5. The communication device of claim 4 is further configured to be communicatively coupled to a control device, wherein the control device is part of a wireless toll collection system.

6. A motor vehicle having a communication device, wherein the communication device is configured to:
communicate at least with one other motor vehicle or at least one stationary receiver, for which purpose a wireless communication connection based on linearly polarized electromagnetic waves is used;
transmit a transmission signal with a preset transmission power when using the wireless communication connection;
reduce the preset transmission power depending on a reception of a reception signal, wherein the reception signal uses electromagnetic waves at least partially orthogonally polarized, with respect to the linearly polarized electromagnetic waves, and wherein the linearly polarized electromagnetic waves are vertically polarized electromagnetic waves and the electromagnetic waves orthogonally polarized hereto are at least partially horizontally polarized electromagnetic waves;
ascertain if the reception signal uses circularly polarized electromagnetic waves;
if it is ascertained that the reception signal uses the circularly polarized electromagnetic waves, capture and evaluate reception signal parts of the reception signal, the reception signal parts being a horizontal reception power of a horizontal reception signal part of the reception signal and a vertical reception power of a vertical reception signal part of the reception signal to ascertain a reception power of the reception signal;
adjust a phase of the horizontal reception signal part to compensate for propagation time differences that occur due to the capture and/or the evaluation of the reception signal parts by the communication device; and
reduce the preset transmission power if the reception power of the reception signal is greater than a preset comparative value.

* * * * *